US008619695B2

(12) United States Patent  
Cho et al.

(10) Patent No.: US 8,619,695 B2
(45) Date of Patent: Dec. 31, 2013

(54) RANGING OF TERMINAL IN LEGACY SUPPORT MODE

(75) Inventors: Hee Jeong Cho, Anyang-si (KR); Jin Sam Kwak, Anyang-si (KR); Yong Ho Kim, Anyang-si (KR); Young Soo Yuk, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 13/381,774

(22) PCT Filed: Jul. 5, 2010

(86) PCT No.: PCT/KR2010/004354
§ 371 (c)(1),
(2), (4) Date: Dec. 30, 2011

(87) PCT Pub. No.: WO2011/002264
PCT Pub. Date: Jan. 6, 2011

(65) Prior Publication Data
US 2012/0106515 A1    May 3, 2012

Related U.S. Application Data

(60) Provisional application No. 61/222,942, filed on Jul. 3, 2009.

(30) Foreign Application Priority Data

Jul. 5, 2010  (KR) .......................... 10-2010-0064249

(51) Int. Cl.
*H04W 72/04* (2009.01)
(52) U.S. Cl.
USPC .......................................... 370/329; 370/331

(58) Field of Classification Search
USPC .................................................. 370/229, 331
See application file for complete search history.

(56) References Cited

U.S. PATENT DOCUMENTS

| 8,345,659 B2* | 1/2013 | Chen et al. ..................... 370/350 |
| 2006/0203712 A1 | 9/2006 | Lim et al. |
| 2007/0104177 A1 | 5/2007 | Hwang et al. |

(Continued)

OTHER PUBLICATIONS

IEEE 802.16 Broadband Wireless Access Working Group, "The Draft IEEE 802.16m System Description Document", Jun. 16, 2008.

(Continued)

*Primary Examiner* — Hassan Kizou
*Assistant Examiner* — Abdullahi Ahmed
(74) *Attorney, Agent, or Firm* — McKenna Long & Aldridge LLP

(57) ABSTRACT

The present invention relates to a broadband wireless access system, and more particularly, a ranging technique of a terminal using a legacy support frame in a mobile communication system including a legacy system and an advanced system. According to one form of an embodiment of the present invention, the ranging method of the terminal for a base station in the mobile communication system having the legacy system and the advanced system comprises the steps of: receiving secondary super frame header (S-SFH) information from the base station; determining whether a frame composition used in the mobile communication system supports the legacy system; acquiring ranging channel information for initial ranging, handover ranging, and periodical ranging from the S-SFH; and performing one or more ranging processes of the initial ranging, the handover ranging, and the periodical ranging in the base station by using the ranging channel information.

12 Claims, 7 Drawing Sheets

(56) References Cited

U.S. PATENT DOCUMENTS

2009/0161616 A1* 6/2009 Ramesh et al. ............... 370/329
2010/0002631 A1* 1/2010 Cho et al. ..................... 370/328
2010/0255851 A1* 10/2010 Kwak et al. .................. 455/450
2011/0051667 A1* 3/2011 Park et al. .................... 370/328

OTHER PUBLICATIONS

Mirin Lew, "Mobile WiMAXTM: Wave 2 and Beyond", Wireless Test World 2009, Jun. 1, 2009.

* cited by examiner

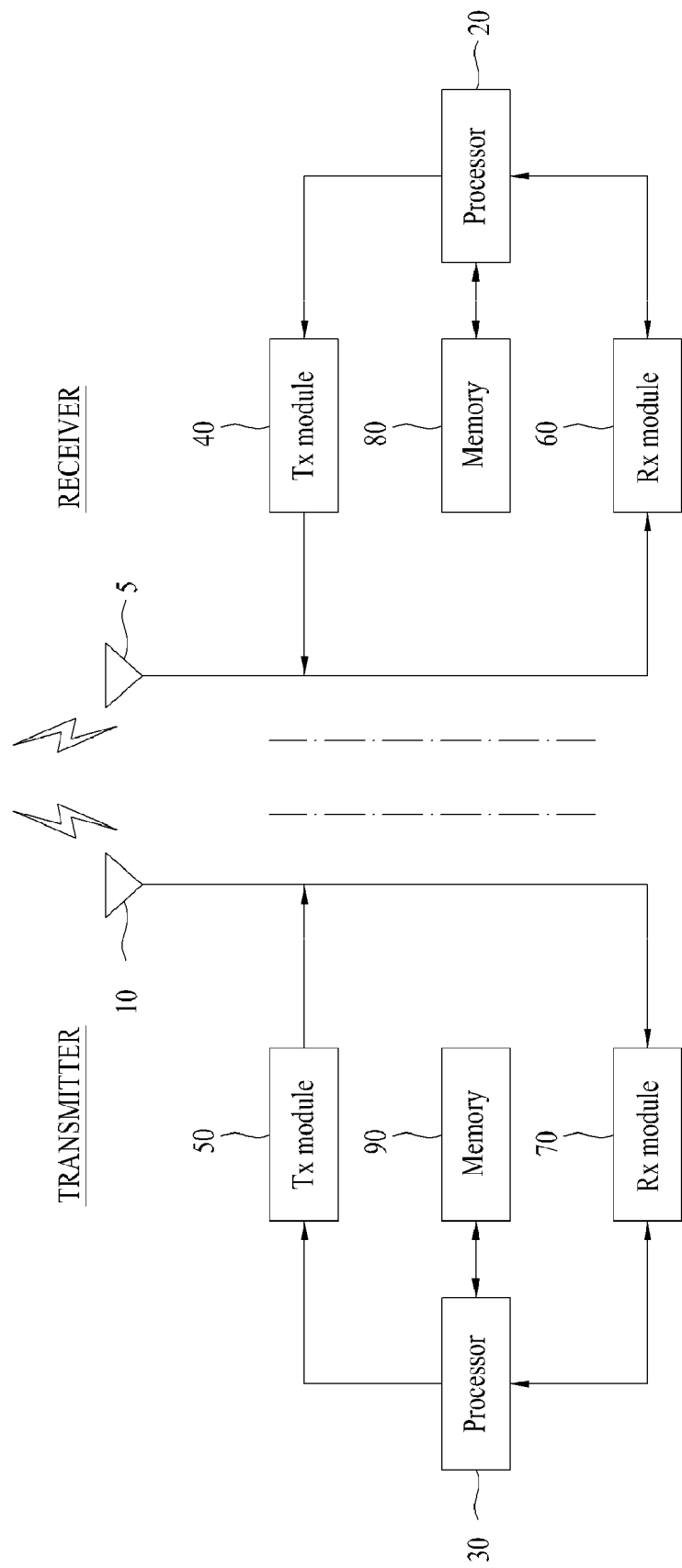

RANGING OF TERMINAL IN LEGACY SUPPORT MODE

This application is a 35 U.S.C. §371 National Stage entry of International Application No. PCT/KR2010/004354, filed on Jul. 5, 2010, and claims the benefit of priority of U.S. Provisional application Nos. 61/222,942 filed Jul. 3, 2009 and Korean Patent Application No. 10-2010-0064249 filed on Jul. 5, 2010, all of which are incorporated by reference in their entirety herein.

TECHNICAL FIELD

The following description relates to a technique of performing ranging at a terminal using a legacy support frame in a mobile communication system in which a legacy system and an advanced system coexist.

BACKGROUND ART

A base station of a system which simultaneously supports a legacy system and an advanced system may operate in a mixed mode. Hereinafter, a mixed mode operation will be described on the assumption that a legacy system is an IEEE 802.16e system and an advanced system is an IEEE 802.16m system.

The mixed mode is divided into a WirelessMAN OFDMA zone (hereinafter, referred to as "L zone": LZone) supporting a legacy (IEEE 802.16e) terminal and an advanced wireless interface zone (hereinafter, referred to as "M zone": MZone) supporting an IEEE 802.16m terminal. In the mixed mode, an uplink (UL) zone may be divided into an L zone and an M zone using a time division multiplexing (TDM) or frequency division multiplexing (FDM) scheme. A ranging channel of an IEEE 802.16e system uses a diversity permutation type partial usage of subchannel (PUSC) structure and a ranging channel of an IEEE 802.16m system uses a subband contiguous resource unit (CRU) structure.

FIG. 1 shows an example of a TDD frame structure of a mixed-mode system applicable to an IEEE 802.16m system.

The frame structure shown in FIG. 1 is divided into a WirelessMAN OFDMA uplink/downlink zone and an advanced wireless interface uplink/downlink zone in downlink and uplink using a TDM scheme.

FIG. 2 is a diagram showing a TDD frame structure supporting a Wireless MAN-OFDMA uplink FDM operation.

The frame structure shown in FIG. 2 is divided into a WirelessMAN OFDMA downlink zone and an advanced interface downlink zone using a TDM scheme in downlink and is divided into an L zone and an M zone using an FDM scheme in uplink. That is, the WirelessMAN OFDMA downlink zone, the advanced wireless interface downlink zone and an uplink zone multiplexed using the FDM scheme correspond to a wirelessMAN frame having a length of 5 ms in a time domain. In case of the advanced wireless interface frame, the wirelessMAN OFDMA downlink zone may be regarded as a frame offset and a subsequent zone having a length of 5 ms may be regarded as a frame.

Unlike the system which operates using the TDM scheme as shown in FIG. 1, the system which operates using the FDM scheme as shown in FIG. 2 cannot use different permutation schemes. Thus, the IEEE 802.16m terminal must also use a ranging channel structure of the IEEE 802.16e system. That is, the system needs to be designed to allocate a ranging channel only to an L zone in consideration of overhead and to enable IEEE 802.16m terminals to share the ranging channel.

DISCLOSURE

Technical Problem

A base station which supports only an IEEE 802.16m terminal informs terminals of ranging channel information, information necessary to generate codes and the number of codes to be used (for initial/handover ranging) through a secondary super frame header (S-SFH). In the case in which a ranging region is allocated only to an L zone, a used ranging channel structure, a code generation method, etc. are changed. Thus, a base station of a mixed-mode system must transmit S-SFH including information about the used ranging channel structure, the coding generation method, etc. A terminal also needs to analyze the S-SFH using a method different from that of an IEEE 802.16m terminal.

An object of the present invention is to provide an efficient L-Zone ranging channel structure of a mixed-mode base station.

Another object of the present invention is to provide a method of efficiently acquiring a L-Zone ranging channel information of a mixed-mode base station at an IEEE 802.16m terminal.

The technical problems solved by the present invention are not limited to the above technical problems and those skilled in the art may understand other technical problems from the following description.

Technical Solution

The object of the present invention can be achieved by providing a method of, at a terminal, performing a ranging procedure with respect to a base station in a mobile communication system in which a legacy system and an advanced system coexist, the method including receiving information about a secondary super frame header (S-SFH) from the base station, determining whether a frame configuration used in the mobile communication system supports the legacy system, acquiring ranging channel information for performing initial ranging, handover ranging and periodic ranging from the S-SFH if the frame configuration supports the legacy system, and performing at least one of the initial ranging, the handover ranging and the periodic ranging with respect to the base station using the ranging channel information. At this time, the terminal receives the S-SFH via a first zone supporting the advanced system in the frame and the ranging channel is allocated to a second zone supporting the legacy system in the frame.

In another aspect of the present invention, there is provided a terminal which performs a ranging procedure with respect to a base station in a mobile communication system in which a legacy system and an advanced system coexist, the terminal including a processor, and a radio frequency (RF) communication module configured to transmit or receive an RF signal to or from the base station under the control of the processor. The processor determines whether a frame configuration used in the mobile communication system supports the legacy system if information about a secondary super frame header (S-SFH) is received from the base station via the RF module, acquires ranging channel information for performing initial ranging, handover ranging and periodic ranging from the S-SFH if the frame configuration supports the legacy system, and performs at least one of the initial ranging, the handover ranging and the periodic ranging with respect to the base station using the ranging channel information, and the S-SFH is transmitted to the RF communication module via a first zone supporting the advanced system in the frame and the ranging channel is allocated to a second zone supporting the legacy system in the frame.

The ranging channel information may include at least one of ranging channel allocation information, start code information of a ranging channel, ranging code division information and permutation base information.

The frame may include a ranging subframe including a first ranging channel for a synchronized terminal and a second ranging channel for a non-synchronized terminal, and the initial ranging and the handover ranging may be performed using the second ranging channel and the periodic ranging is performed using the first ranging channel.

The ranging channel allocation information may include at least one of an allocation period of the ranging subframe, time domain location information of the ranging subframe and the number of channels.

The ranging code division information may include the number of codes for the initial ranging, the number of codes for handover ranging, the number of codes for periodic ranging and start code index information.

The legacy system may be a WirelessMAN-OFDMA system and the advanced system may be an IEEE 802.16m system.

Advantageous Effects

According to the embodiments of the present invention, it is possible to enable a terminal to efficiently acquire ranging channel information and to perform ranging in a mixed-mode system having a frame structure in which a ranging channel is allocated only to an L zone.

The effects of the present invention are not limited to the above-described effects and other effects which are not described herein will become apparent to those skilled in the art from the following description.

DESCRIPTION OF DRAWINGS

FIG. 7 is a block diagram showing an example of a transmitter and a receiver according to another embodiment of the present invention.

BEST MODE

Figure 1:
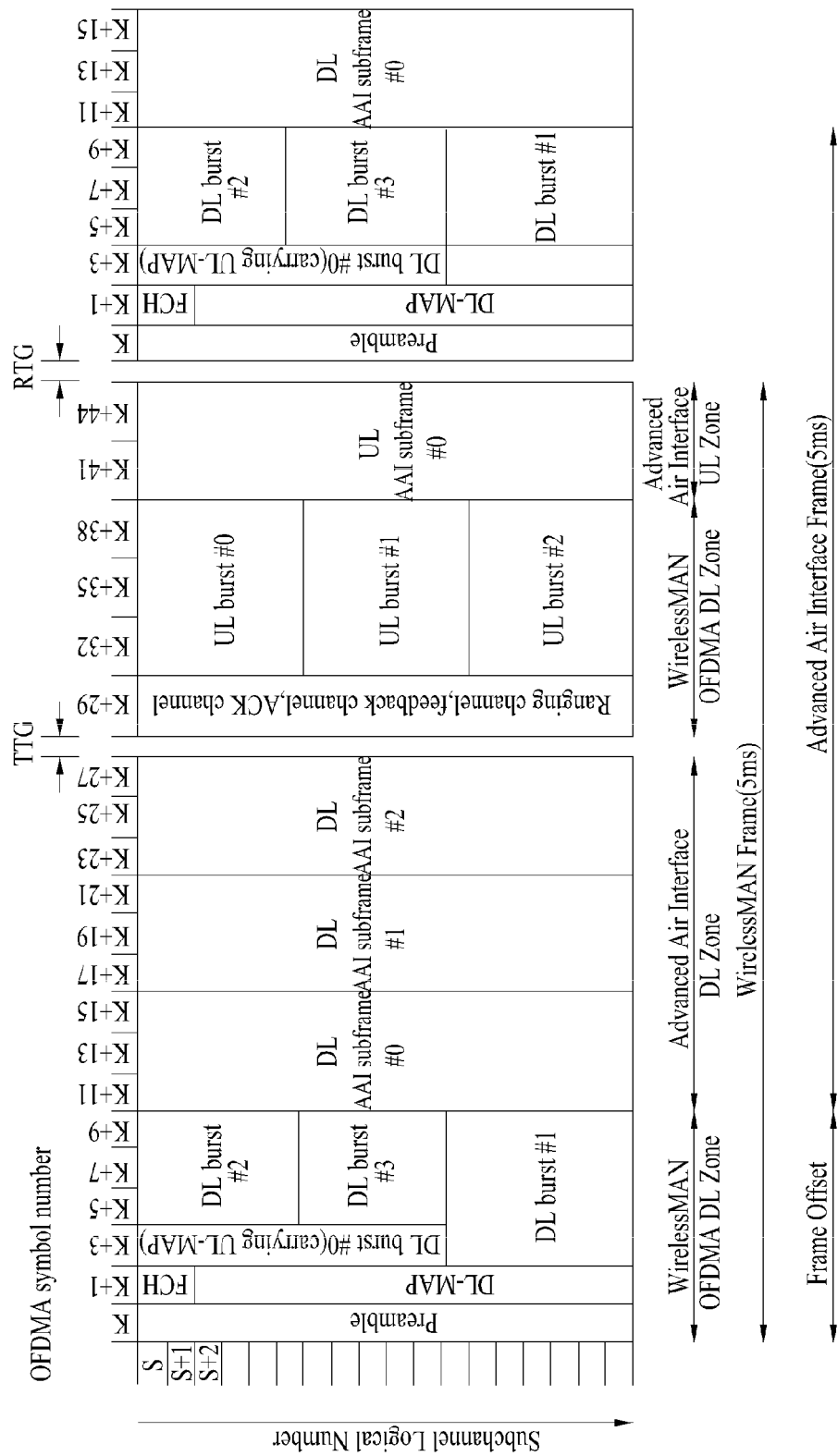
FIG. 1 is a diagram showing an example of a TDD frame structure of a mixed-mode system applicable to an IEEE 802.16m system.
Figure 2:
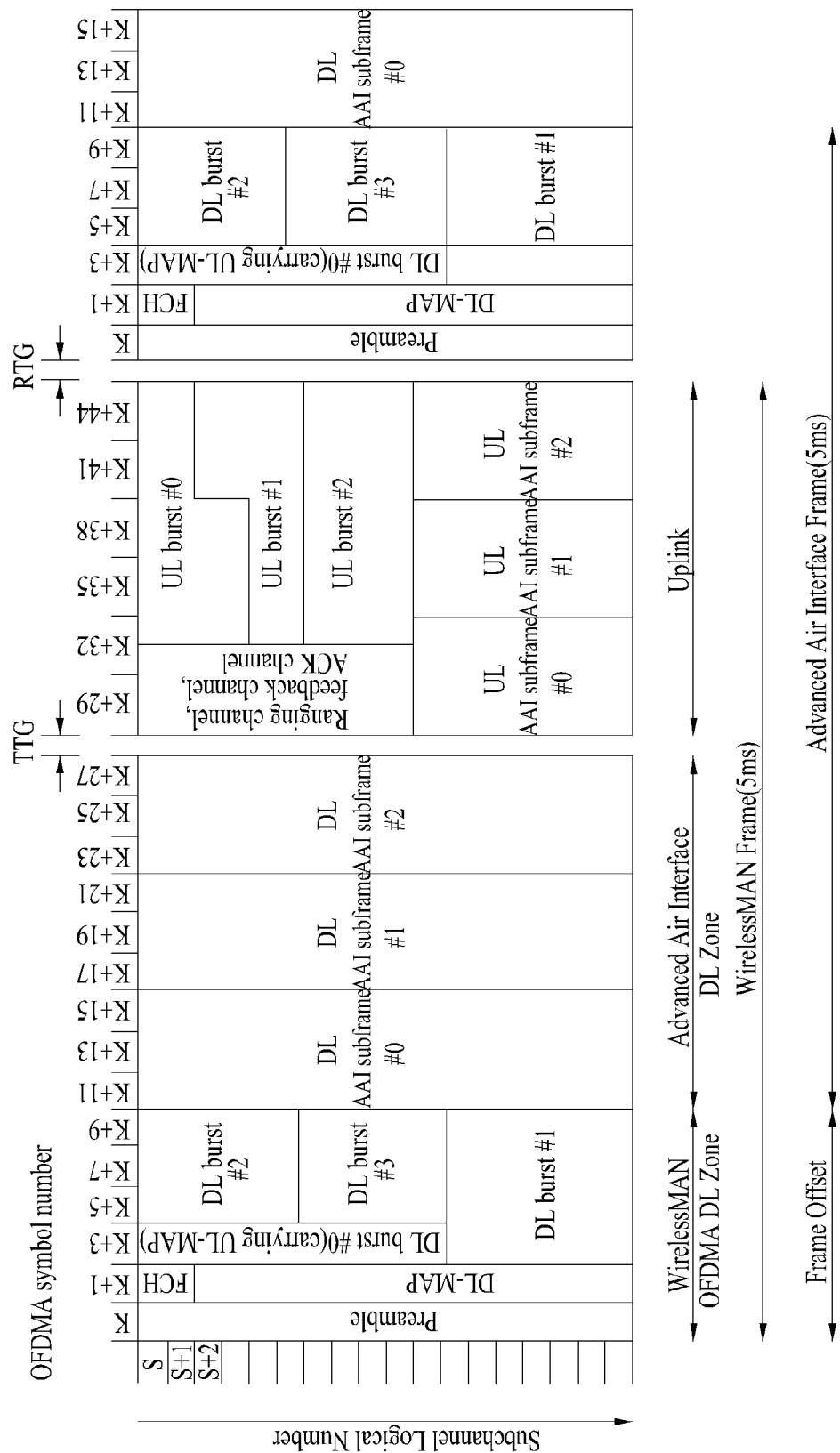
FIG. 2 is a diagram showing a TDD frame structure supporting a WirelessMAN-OFDMA uplink FDM operation.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station" may be replaced with the terms fixed station, Node-B, eNode-B (eNB), access point (AP) or advanced BS (ABS) as necessary. The term "terminal" may also be replaced with the term user equipment (UE), mobile station (MS), mobile subscriber station (MSS), advanced MS (AMS) or subscriber station (SS) as necessary.

In particular, in the present specification, for convenience, a system to which a general technology including the IEEE 802.16e standard is applied is referred to as a "legacy system". A terminal to which the legacy technology is applied is referred to as a "YMS (Yardstick MS)" or a "legacy terminal", and a BS to which the legacy technology is applied is referred to as a "YBS (Yardstick BS)" or a "legacy BS".

A system to which an advanced technology including the IEEE 802.16m standard (WirelessMAN-OFDMA Advanced System) is applied is referred to as an "advanced system". An MS to which the advanced technology is applied is referred to as an "advanced MS (AMS)" or an "advanced terminal", and a BS to which the advanced technology is applied is referred to as an "advanced BS (ABS)" or an "advanced base station".

The following embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so that it can be driven by a processor. The memory unit is located inside or outside of the processor, so that it can communicate with the aforementioned processor via a variety of well-known parts.

The embodiments of the present invention can be supported by the standard documents disclosed in any one of wireless access systems, such as an IEEE802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE802.16 system.

It should be noted that specific terms disclosed in the present invention are proposed for convenience of description and better understanding of the present invention, and the use of these specific terms may be changed to another format within the technical scope or spirit of the present invention.

As described above, in a mixed mode, a UL zone is divided into an L zone and an M zone using a TDM scheme or an FDM scheme. Since a ranging channel of an IEEE 802.16e system uses a PUSC and a ranging channel of an IEEE 802.16m system uses a subband CRU, if the uplink zone is divided into the L zone and the M zone using the FDM scheme, the ranging channel cannot be shared.

If the frame structure of a mixed-mode system is divided using an FDM scheme, a ranging channel of an IEEE 802.16m terminal needs to have the same structure as a ranging channel of an IEEE 802.16e system or needs to have a new structure suiting the PUSC. At this time, if the ranging channel of the mixed-mode system has the same structure as the ranging channel of the IEEE 802.16e system, in order to more efficiently use resources and reduce overhead, a BS may allocate a ranging channel only to the L zone, not to the M zone. Then, an AMS may perform a ranging procedure with respect to the BS through the ranging channel allocated to the L zone. In the present invention, although it is assumed that the ranging channel is mandatorily allocated only to the L zone in an FDM frame structure, even in a TDM frame structure, the ranging channel may be allocated only to the L zone in consideration of overhead occurring when the ranging channel is allocated to the M zone.

In one embodiment of the present invention, a method of efficiently transmitting system information associated with a ranging procedure from a base station (ABS) to a terminal (AMS) through a ranging channel allocated only to an L zone is proposed.

The AMS needs to determine whether the ABS to be subjected to a ranging procedure is a mixed-mode system and to determine whether a frame structure is a TDM frame structure or an FDM frame structure if the ABS is the mixed-mode system.

A determination as to whether the ABS is a mixed-mode system, that is, a determination as to whether the ABS supports a legacy terminal (YMS), may be indicated to the AMS through a "WirelessMAN_OFDMA support" field included in a secondary super frame header sub packet 1 (S-SFH SP1) or a media access control (MAC) version field included in an S-SFH SP2. For example, the AMS determines that the ABS is a mixed-mode system if the field is set to 1 and determines that the ABS is not a mixed-mode system if the field is set to 0.

A determination as to whether a frame structure is a TDM frame structure or an FDM frame structure may be indicated to the AMS through a "frame configuration index" field included in the S-SFH SP1.

If the ranging channel is allocated only to the L zone as the result of determining whether the ABS to be subjected to the ranging procedure is a mixed-mode system and whether the frame structure of the ABS is a TDM frame structure or an FDM frame structure using the above-described methods, information about the ranging channel and parameters associated with the ranging procedure to be performed must be acquired.

In the present embodiment, in a mixed-mode system in which a ranging channel is allocated only to an L zone, information about the ranging channel and parameters associated with a ranging procedure to be performed is transmitted via a super frame header.

Table 1 shows an example of a format of information about a ranging channel allocated only to an L zone and information associated with a ranging procedure to be performed according to an embodiment of the present invention.

TABLE 1

1. Initial/handover Ranging channel information
2. RNG codes information (Start of ranging codes group, Permutation base)
3. HO ranging codes
4. HO Ranging backoff start
5. HO Ranging backoff end
6. ABS EIRP
7. EIRxPIR, max
8. TTG
9. RTG
10. UL_initial_transmit_timing
11. UL_Allocation_Start_Time
12. Initial ranging codes
13. Initial Ranging backoff start
14. Initial Ranging backoff end
15. Periodic Ranging channel information
16. Periodic ranging codes
17. Periodic Ranging backoff start
18. Periodic Ranging backoff end In Table 1, information included in a conventional super frame header is omitted and information which is newly added to implement the present embodiment is included.

1. Initial/Handover Ranging Channel Information:

Indicates an initial/handover ranging zone allocated to an L zone. Such information may include parameters such as a dedicated ranging indicator, a ranging method and the number of subchannels/OFDMA symbols. Ranging zone information is defined similarly to a legacy system (that is, the IEEE 802.16e system) or is defined as a specific value according to an included S-SFH SP so as to optimize a bit size. Hereinafter, parameters configuring this information will be described in greater detail.

1) Dedicated ranging indicator: Indicates whether a ranging zone is for normal ranging or for dedicated ranging. If normal ranging information and dedicated ranging information are transmitted via the same channel (e.g., the same S-SFH SP), this parameter is preferably mandatorily included. On the contrary, if normal ranging information and dedicated ranging information are transmitted using different methods (e.g., the normal ranging information is transmitted via an S-SFH and the dedicated ranging information is transmitted via an A-MAP or MAC management message), this parameter may be omitted.

2) Ranging method: Indicates whether the ranging zone is for initial/handover ranging or periodic ranging. At this time, an S-SFH may be configured such that a zone for initial/handover ranging is transmitted via an S-SFH SP1 and a zone for periodic ranging is transmitted via an S-SFH SP3. If a ranging channel format, in which a periodic ranging channel of a unit of one symbol is arranged next to an initial/handover ranging channel of a unit of 2 symbols, is defined in advance, this field may be omitted.

3) Number of subchannels/OFDMA symbols: Indicates the number of subchannels or OFDMA symbols. However, in the present embodiment, this indicates the number of initial/handover ranging channels (opportunities), which will be described with reference to FIG. 3.

Figure 3:
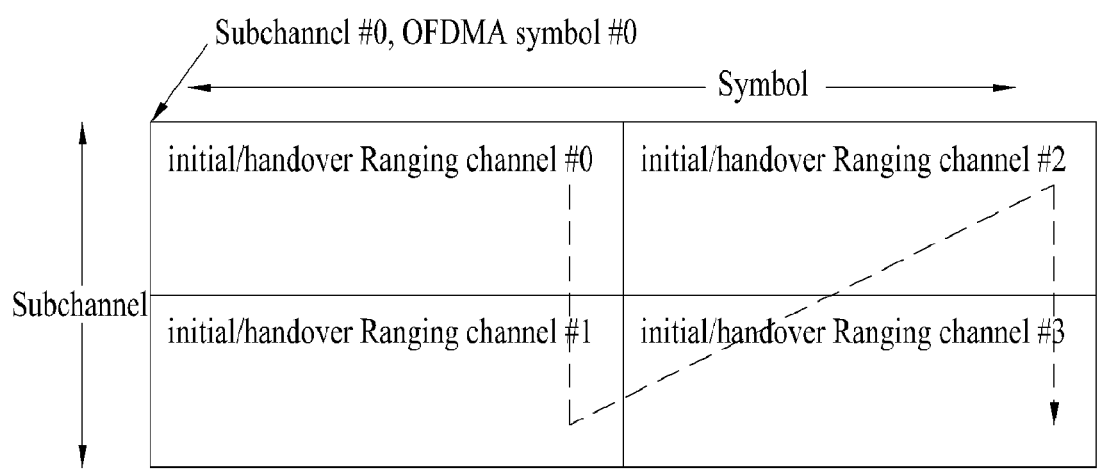
FIG. 3 is a diagram showing an example of a ranging channel allocation format according to an embodiment of the present invention.

FIG. 3 is a diagram showing an example of a ranging channel allocation format according to an embodiment of the present invention.

If the number of ranging channels is "4", initial/handover ranging channels are allocated as shown in FIG. 3. The ABS maximally allocates ranging channels starting from a subchannel index "0" and an OFDMA symbol index "0" until all subchannels allocated in the OFDMA symbols (indexes of 0 to 1—it is assumed that the initial/handover ranging channels are allocated over two symbols) are occupied within the number of opportunities. If all four ranging channels cannot be allocated to the first symbol, the remaining ranging channels may be allocated to a next OFDMA symbol.

This field may further include a subchannel offset and OFDMA symbol offset information in order to indicate a location where ranging channel allocation starts. However, these fields may be omitted if the values thereof are always fixed to 0. A field indicating a ranging zone allocation period (e.g., 2^d; d being an integer) is preferably mandatorily included.

2. Ranging (RNG) Codes Information

Includes a "start of ranging codes group" field and a "permutation base" field. The "permutation base" field indicates information necessary for the AMS to generate ranging codes. Among the codes generated using this information, a first ranging code index to be used by the AMS may be identified via the "start of ranging codes group" field. That is, among the codes generated using the "permutation base" field, if a code indicated by the "start of ranging codes group" field and any one code of a ranging codes group including next codes are received, the ABS may determine that the AMS attempts a ranging procedure.

3. Handover (HO) Ranging Codes:

Indicates the total number of ranging codes used for handover. The handover ranging code index may start from the "start of ranging codes group" field. For example, if the value of the "start of ranging codes group" field is "3" and the value of the "HO ranging codes" field is "5", the AMSs use code indexes 3, 4, 5, 6 and 7 for HO.

4/5. HO Ranging Backoff Start/End

Indicates the start/end of a backoff operation time due to ranging failure when a handover ranging procedure is performed.

6/7. BS EIRP/EIRxPIR,Max:

Indicates information used when calculating maximum transmit power used when the AMS transmits ranging codes to the ABS. The AMS cannot transmit the ranging codes to the ABS with power exceeding the maximum transmit power.

8/9. TTG/RTG:

Indicates information indicating the length of a gap between an uplink zone and a downlink zone in the frame structure of the ABS. This value may be fixed and omitted or may be represented by 1 bit.

10. UL_initial_transmit_timing:

One of the following definitions may be fixed and omitted.
0b00000000: Refers to a "UL_Allocation_Start_Time" parameter as timing.
0b00000001-0b11111110: As the timing of the AMS refer to Timing offset of a unit of two physical slots (PSs) before "UL_Allocation_Start_Time". If this value is greater than a "TTG-SSRTG" value, the AMS determines "TTGSSRTG". For example, "0b00000001" may indicate "initial timing reference=UL_Allocation_Start_Time−2 PSs.

0b11111111: The timing may be set to "UL_Allocation_Start_Time−TTG+SSRTG". If this value is not present, the default value of the initial timing at the MS becomes "UL_Allocation_Start_Time".

11. UL_Allocation_Start_Time:

May be fixed to a specific value (e.g., 0) and may be omitted.

12. Initial Ranging Codes:

Indicates the number of ranging codes used for initial ranging. An initial ranging code index may start from a next index of an index which is lastly allocated for handover. For example, if the value of the "start of ranging codes group" field is "3", the value of the "HO ranging codes" field is "5" and the value of the "initial ranging codes" field is "2", the AMSs use code indexes 8 and 9 for initial ranging.

15. Periodic Ranging Channel Information

As periodic ranging channel information, the following fields may be included.

1) Dedicated ranging indicator: Indicates whether a ranging zone is for normal ranging or dedicated ranging. If normal ranging information and dedicated ranging information are transmitted via the same channel (e.g., the same S-SFH SP), this parameter is preferably mandatorily included. On the contrary, if normal ranging information and dedicated ranging information are transmitted using different methods (e.g., the normal ranging information is transmitted via an S-SFH and the dedicated ranging information is transmitted via an A-MAP or MAC management message), this parameter may be omitted.

2) Ranging method: Indicates whether the ranging zone is for initial/handover ranging or periodic ranging. At this time, an S-SFH may be configured such that a zone for initial/handover ranging is transmitted via an S-SFH SP1 and a zone for periodic ranging is transmitted via an S-SFH SP3. If a ranging channel format in which a periodic ranging channel of a unit of one symbol is arranged next to an initial/handover ranging channel of a unit of 2 symbols is defined in advance, this field may be omitted.

3) Number of subchannels/OFDMA symbols: Indicates the number of subchannels or OFDMA symbols. However, in the present embodiment, it indicates the number of periodic ranging channels (opportunities), which will be described with reference to FIGS. 4 and 5.

Figure 4:
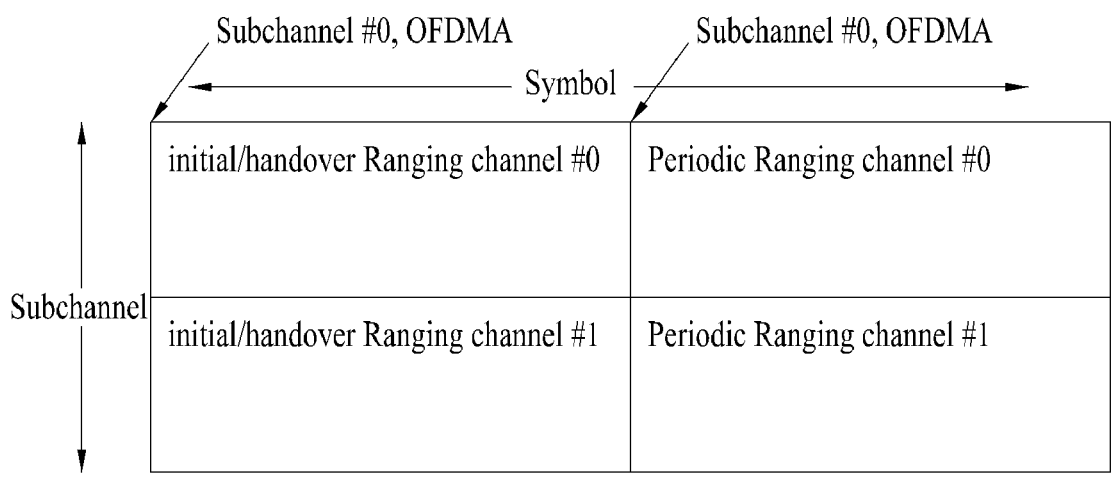
FIG. 4 is a diagram showing another example of a ranging channel allocation format according to the embodiment of the present invention.

FIG. 4 is a diagram showing another example of a ranging channel allocation format according to the embodiment of the present invention.

In FIG. 4, it is assumed that the initial/handover ranging channel has one subchannel and two OFMMA symbols and the periodic ranging channel includes one subchannel and one OFDMA symbol. The reason why the size of the periodic ranging channel is less than that of the initial/handover ranging channel is because periodic ranging is mostly performed in a state in which synchronization between the AMS and the ABS is performed, unlike initial/handover ranging.

For example, if the number of periodic ranging channels is "2" and the number of initial/handover ranging channels is "2", the periodic ranging channels may be allocated as shown in FIG. 4. That is, if it is assumed that all the initial/handover ranging channels are allocated to the subchannels of the OFDMA symbol indexes 0 and 1 and all the subchannels are occupied, allocation of the periodic ranging channels starts at the subchannel #0 and the OFDMA symbol #2. The ABS maximally allocates the periodic ranging channels within the number of opportunities until all subchannels of the OFDMA symbol (index of 2) are occupied. If all the periodic ranging channels corresponding in number to the number of opportunities cannot be allocated in the OFDMA symbol, the remaining periodic ranging channels may be allocated to a next OFDMA symbol.

Figure 5:
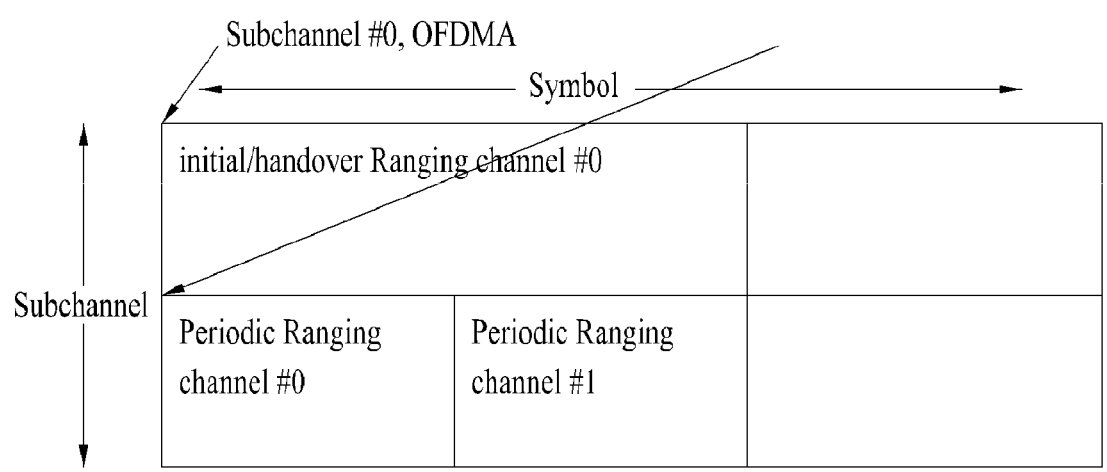
FIG. 5 is a diagram showing another example of a ranging channel allocation format according to the embodiment of the present invention.

FIG. 5 is a diagram showing another example of a ranging channel allocation format according to the embodiment of the present invention.

In FIG. 5, it is assumed that an initial/handover ranging channel has one subchannel and two OFDMA symbols and a periodic ranging channel has one subchannel and one OFDMA symbol.

Referring to FIG. 5, it is assumed that the number of initial/handover ranging channels is "1", the channel is first allocated to the subchannels of the OFDMA symbol indexes 0 and 1, and remaining subchannels are present. In this case, allocation of the periodic ranging channels starts at a next index of a last subchannel, to which the initial/handover ranging channel is allocated, that is, at the index #1 and the OFDMA symbol #0. That is, the periodic ranging channels are maximally allocated within the number of opportunities until all the subchannels of the OFDMA symbol #0 are occupied. If the periodic ranging channels corresponding in number to the number of opportunities cannot be allocated in the OFDMA symbol, the remaining ranging channels may be allocated to a next OFDMA symbol.

This field may further include a subchannel offset and OFDMA symbol offset information in order to indicate a location where ranging channel allocation starts. However, these fields may be omitted if the values thereof are always fixed to 0. A field indicating a ranging zone allocation period (e.g., $2^d$; d being an integer) is preferably mandatorily included.

The parameters of Table 1 are exemplary and ranging related information may be transmitted to the ABS via more or fewer parameters.

A repetition coding scheme or a modulation and coding scheme (MCS) different from that of an SFH transmitted in a system supporting only an AMS is applicable to specific super frame headers P-SFH and S-SFH SP 1, 2 and 3 in a mixed mode.

According to another example of the present embodiment, if a ranging channel is allocated only to an L zone of an ABS which operates in a mixed mode, information necessary for the AMT to perform ranging may be divided into an L zone and an M zone in a corresponding ranging zone to be transmitted.

For example, the ABS may transmit only information except for periodic ranging channel information via the M zone. In this case, the AMS must decode a UL-MAP or a UL channel descriptor (UCD) of the L zone in order to acquire the periodic ranging channel information. At this time, the ABS may transmit information (UCD uplink interval usage code (UIUC)), MCS information of UL-MAP, UCD/UL-MAP transmission location, etc.) necessary for the AMS to decode the UL-MAP or UCD of the L zone via an SFH.

According to another example of the present embodiment, the ABS may transmit all information required for the AMS to perform the ranging procedure only via the L zone. In this case, the AMS decodes the UL-MAP and UCD/DCD of the L zone in order to acquire the information. At this time, the ABS may transmit information (UCD/DCD UIUC, MCS information of UL-MAP, UCD/DCD/UL-MAP transmission location, etc.) necessary for the AMS to decode the UL-MAP/UCD/DCD via an SFH.

Hereinafter, a ranging procedure of an IEEE 802.16m terminal (AMS), assuming an ABS which operates in a mixed mode allocates a ranging channel only to an L zone, will be described with reference to FIG. 6.

Figure 6:
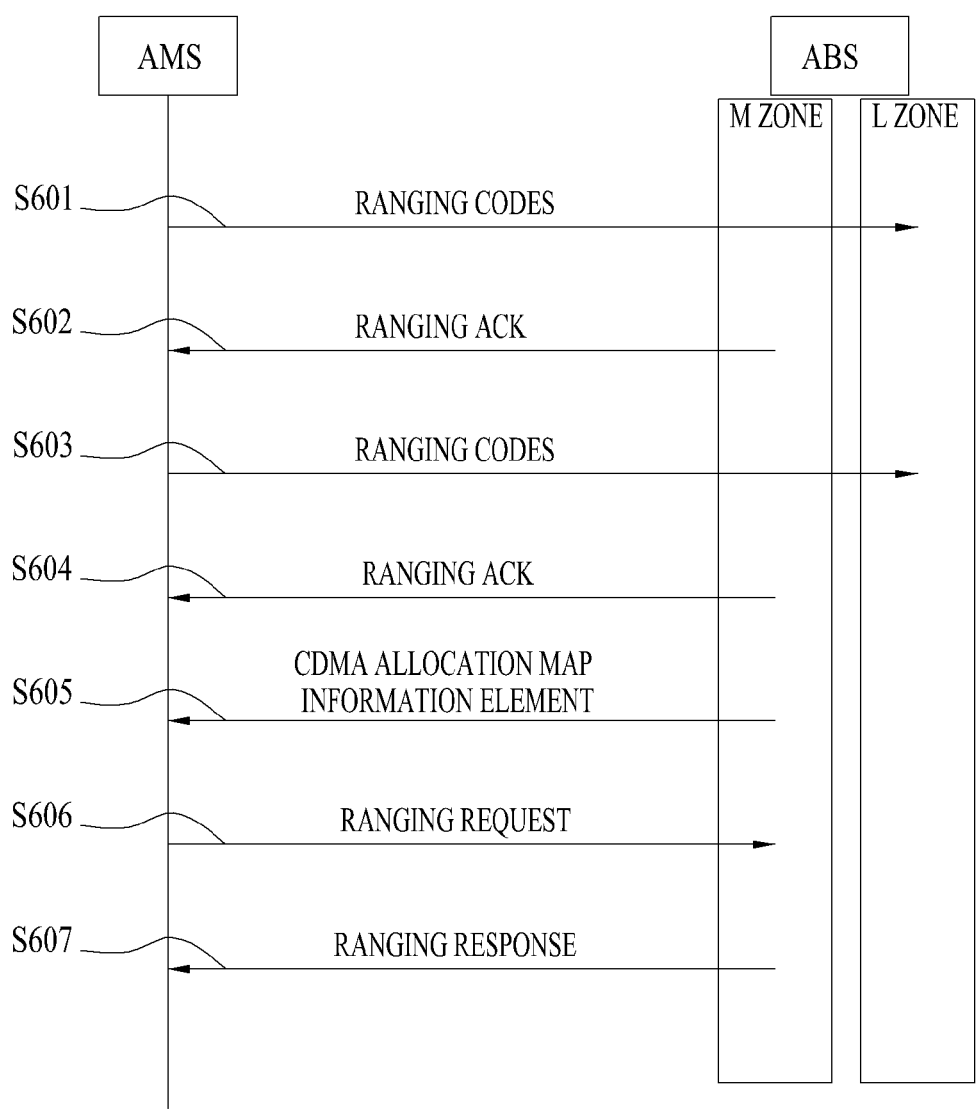
FIG. 6 is a diagram showing an example of a ranging procedure of a terminal according to an embodiment of the present invention.

In FIG. 6, it is assumed that the AMS acquires information about the ranging channel allocated only to the L zone and information for performing the ranging procedure using any one of the above-described methods.

The AMS may transmit ranging codes allocated to the AMS to the ABS via the ranging channel of the L zone (S601).

When the ABS receives the ranging codes (that is, codes transmitted via an SFH or allocated to specific AMSs) occupied for the IEEE 802.16m terminals (AMSs) via the ranging channel of the L zone, the ABS transmits a ranging ACK message AAI_RNG-ACK via the M zone in response thereto (S602).

If the ABS does not detect the codes transmitted by the AMS or the value of the ranging state field of the ranging ACK message is "continue", the AMS retransmits the codes via the ranging channel of the L zone (S603).

If the ABS successfully receives the codes retransmitted by the AMS, the ABS transmits, to the AMS, a ranging ACK message in which the value of the ranging state field is set to "success" and a CDMA allocation A-MAP IE including resource allocation information for enabling the AMS to transmit a ranging request message via the M zone (S604 and 605).

Thereafter, the AMS transmits the ranging request message AAI_RNG-REQ via the M zone indicated by the resource allocation information and the ABS transmits a ranging response message AAI_RNG-RSP to the AMS in response thereto (S606 and S607).

Structure of Terminal and Base Station

Hereinafter, a terminal and a base station (FBS and MBS), in which the above-described embodiments of the present invention will be performed, according to another embodiment of the present invention will be described.

The terminal may function as a transmitter in uplink and function as a receiver in downlink. The base station may function as a receiver in uplink and function as a transmitter in downlink. That is, the terminal and the base station may include a transmitter and a receiver for transmission of information or data.

The transmitter and the receiver may include a processor, a module, a portion and/or means for performing the embodiments of the present invention. In particular, the transmitter and the receiver may include a module (means) for encrypting a message, a module for decrypting an encrypted message, and an antenna for transmitting or receiving a message. An example of the transmitter and the receiver will be described with reference to FIG. 7.

FIG. 7 is a block diagram showing an example of the structures of a transmitter and a receiver according to another embodiment of the present invention.

Referring to FIG. 7, a left side shows the structure of the transmitter and a right side shows the structure of the receiver. The transmitter and the receiver may include antennas 5 and 10, processors 20 and 30, transmission (Tx) modules 40 and 50, reception (Rx) modules 60 and 70, and memories 80 and 90, respectively. These components may perform corresponding functions. Hereinafter, the components will be described in more detail.

The antennas 5 and 10 include a Tx antenna for transmitting signals generated by the Tx modules 40 and 50 to external devices and an Rx antenna for receiving radio signals from external devices and transmitting the radio signals to the Rx modules 60 and 70. The number of antennas may be two or more if a Multiple-Input Multiple-Output (MIMO) function is supported.

The antenna, the Tx module and the Rx module may configure a radio frequency (RF) communication module.

The processors 20 and 30 generally control the overall operations of the mobile terminal. For example, the processors may perform a controller function for performing the above-described embodiments of the present invention, a MAC frame variable control function according to service characteristics and transmission environment, a handover function and an authentication and encryption function. In particular, the processor 20 and 30 may perform overall operation for performing handover by changing the zone shown in FIG. 5.

In particular, the processor of the mobile terminal (AMS) may acquire the SFH of the base station so as to determine whether the base station operates in a mixed mode or a frame structure is a TDM frame structure or an FDM frame structure. If the base station operates in the mixed mode and the ranging channel is allocated only to the L zone, the processor of the AMS may acquire information about the ranging channel allocated to the L zone and information for performing the ranging procedure via the SFH. Thereafter, the processor of the AMS may transmit ranging codes via the ranging channel allocated to the L zone of the base station using the acquired ranging related information and control the subsequent procedure via the M zone.

The processor of the terminal may perform the overall control operation of the above-described embodiments.

The Tx modules 40 and 50 may be scheduled by the processors 20 and 30 so as to perform predetermined coding and modulation with respect to data to be transmitted and to send the data to the antennas 5 and 10.

The Rx modules 60 and 70 may perform decoding and demodulation of the radio signals received through the antennas 5 and 10 and restore and send original data to the processors 20 and 30.

The memories 80 and 90 may store programs for processing and control of the processors 20 and 30 and perform a function for temporarily storing input/output data. In addition, the memories 80 and 90 may include at least one of storage mediums such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

Meanwhile, the base station may perform a controller function for performing the above-described embodiments of the present invention, Orthogonal Frequency Division Multiple Access (OFDMA) packet scheduling, Time Division Duplexing (TDD) packet scheduling and a channel multiplexing function, a MAC frame variable control function according to service characteristics and transmission environment, a high-speed traffic real-time control function, a handover function, an authentication and encryption function, a packet modulation/demodulation function for data transmission, a high-speed packet channel coding function and a real-time modem control function using at least one of the above-described modules, or further include separate means, modules or portions for performing such a function.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

Although examples of applying a more efficient handover procedure and a terminal structure therefor in a broadband radio access system to an IEEE 802.16m system is described, the embodiments of the present invention are applicable to various mobile communication systems such as a 3GPP or 3GPP2 system in addition to an IEEE 802.xx system.

The invention claimed is:

1. A method of, at a terminal, performing a ranging procedure with respect to a base station in a mobile communication system in which a legacy system and an advanced system coexist, the method comprising:
  receiving a secondary super frame header (S-SFH) from the base station;
  determining whether the mobile communication system supports the legacy system;
  acquiring ranging channel information for performing initial ranging, handover ranging and periodic ranging from the S-SFH if the mobile communication system supports the legacy system; and
  performing at least one of the initial ranging, the handover ranging and the periodic ranging with respect to the base station using the ranging channel information,
  wherein the terminal receives the S-SFH via a first zone supporting the advanced system in a frame, and the ranging channel is allocated to a second zone supporting the legacy system in the frame, and
  wherein the terminal transmits ranging codes allocated to the terminal to the base station via the ranging channel of the second zone and, if the terminal does not receive a ranging ACK message from the base station via the first zone, the terminal retransmits the ranging codes to the base station via the ranging channel of the second zone.

2. The method according to claim 1, wherein the ranging channel information includes at least one of ranging channel allocation information, start code information of a ranging channel, ranging code division information and permutation base information.

3. The method according to claim 2, wherein the frame includes a ranging subframe including a first ranging channel for a synchronized terminal and a second ranging channel for a non-synchronized terminal, and
  wherein the initial ranging and the handover ranging are performed using the second ranging channel and the periodic ranging is performed using the first ranging channel.

4. The method according to claim 3, wherein the ranging channel allocation information includes at least one of an allocation period of the ranging subframe, time domain location information of the ranging subframe and the number of channels.

5. The method according to claim 3, wherein the ranging code division information includes the number of codes for the initial ranging, the number of codes for handover ranging, the number of codes for periodic ranging and start code index information.

6. The method according to claim 1, wherein the legacy system is a WirelessMAN-OFDMA system and the advanced system is an IEEE 802.16m system.

7. A terminal which performs a ranging procedure with respect to a base station in a mobile communication system in which a legacy system and an advanced system coexist, the terminal comprising:
- a processor; and
- a radio frequency (RF) communication module configured to transmit or receive an RF signal to or from the base station under the control of the processor,
- wherein the processor determines whether the mobile communication system supports the legacy system if a secondary super frame header (S-SFH) is received from the base station via the RF module, acquires ranging channel information for performing initial ranging, handover ranging and periodic ranging from the S-SFH if the mobile communication system supports the legacy system, and performs at least one of the initial ranging, the handover ranging and the periodic ranging with respect to the base station using the ranging channel information,
- wherein the S-SFH is transmitted to the RF communication module via a first zone supporting the advanced system in a frame, and the ranging channel is allocated to a second zone supporting the legacy system in the frame, and
- wherein the terminal transmits ranging codes allocated to the terminal to the base station via the ranging channel of the second zone and, if the terminal does not receive a ranging ACK message from the base station via the first zone, the terminal retransmits the ranging codes to the base station via the ranging channel of the second zone.

8. The terminal according to claim 7, wherein the ranging channel information includes at least one of ranging channel allocation information, start code information of a ranging channel, ranging code division information and permutation base information.

9. The terminal according to claim 8, wherein the frame includes a ranging subframe including a first ranging channel for a synchronized terminal and a second ranging channel for a non-synchronized terminal, and
- wherein the initial ranging and the handover ranging are performed using the second ranging channel and the periodic ranging is performed using the first ranging channel.

10. The terminal according to claim 9, wherein the ranging channel allocation information includes at least one of an allocation period of the ranging subframe, time domain location information of the ranging subframe and the number of channels.

11. The terminal according to claim 9, wherein the ranging code division information includes the number of codes for initial ranging, the number of codes for handover ranging, the number of codes for periodic ranging and start code index information.

12. The terminal according to claim 7, wherein the legacy system is a WirelessMAN-OFDMA system and the advanced system is an IEEE 802.16m system.

* * * * *